United States Patent [19]

Fujita et al.

[11] Patent Number: 5,084,862
[45] Date of Patent: Jan. 28, 1992

[54] DISK CARTRIDGE SHUTTER

[75] Inventors: Minoru Fujita, Toride; Masaru Yoshida, Ibaraki, both of Japan

[73] Assignee: Hitachi Maxell, Ltd., Osaka, Japan

[21] Appl. No.: 383,433

[22] Filed: Jul. 24, 1989

[30] Foreign Application Priority Data

Jul. 26, 1988 [JP] Japan .................................. 63-184722
Mar. 29, 1989 [JP] Japan .................................. 1-75012

[51] Int. Cl.⁵ .................... G11B 23/033; G11B 3/70; B65D 85/30
[52] U.S. Cl. ........................ 369/291; 360/133; 360/137; 206/444; 264/327
[58] Field of Search .................. 369/290, 291, 292; 360/133; 206/444

[56] References Cited

U.S. PATENT DOCUMENTS

| | | | |
|---|---|---|---|
| 4,589,105 | 5/1986 | Nemoto et al. | 369/291 |
| 4,698,714 | 10/1987 | Sugawara et al. | 369/291 X |
| 4,714,973 | 12/1987 | Kato et al. | 360/133 |
| 4,746,013 | 5/1988 | Suzuki et al. | 369/291 X |
| 4,797,770 | 1/1989 | Takahashi | 369/291 |
| 4,908,726 | 3/1990 | Kato | 369/291 X |

FOREIGN PATENT DOCUMENTS

| | | |
|---|---|---|
| 0160538 | 6/1985 | European Pat. Off. |
| 0201870 | 11/1986 | European Pat. Off. |
| 0202660 | 11/1986 | European Pat. Off. |
| 0236100 | 9/1987 | European Pat. Off. |

Primary Examiner—Stuart S. Levy
Assistant Examiner—Kenneth B. Wells
Attorney, Agent, or Firm—Birch, Stewart, Kolasch & Birch

[57] ABSTRACT

A shutter, made of synthetic resin, for a disk cartridge for closing and opening a head access hole formed in a cartridge casing accommodating therein a rotatable disk comprising a pair of side plates facing each other, a connection plate for connecting corresponding ends of the side plates to provide the shutter with a substantially U-shaped cross-section, and an ejection mark formed by means of ejection pin moulding, disposed on a portion of an outer surface of one of the side plates, such that an end surface of the connection plate is at least partially extended.

7 Claims, 14 Drawing Sheets

DISK CARTRIDGE SHUTTER

BACKGROUND OF THE INVENTION

1. Field of the Invention

The present invention relates to a disk cartridge including a cartridge casing rotatably accommodating a recording medium disk, e.g. a magnetic disk, a photo disk, or a photo-magnetic disk. It also relates to a shutter made of a synthetic resin for opening and closing a read/write window formed in the cartridge casing. The present invention further relates to a manufacturing apparatus for the shutter and a manufacturing method thereof.

2. Discussion of Related Art

A disk cartridge shown in FIG. 22 is known as a one of such cartridge disk. The disk cartridge shown in FIG. 22 comprises a cartridge casing 1 formed by combining two casing halves 1a and 1b together, both made of synthetic resin, and a flexible magnetic disk 2 rotatably accommodated in the casing 1. The magnetic disk 2 is provided at a center portion thereof with a hub 3. The hub 3 is exposed through an opening 4 formed at a center of the cartridge casing 1. A driving apparatus rotates the magnetic disk 2 at a pre-determined rotating speed through the hub 3.

The cartridge casing 1 is provided at opposite sides thereof with rectangular recess portions 6. Read/write windows 5 are formed in the recess portions 6, into which a magnetic head enters. A shutter 7 of a U-shaped cross section rides slidably astride the recess portions 6.

The shutter 7 comprises two side plates 9a, 9b and a connecting member 10 for connecting one ends of the side plates 9a, 9b. The shutter 7 further comprises a rectangular head access hole 8 of the substantially the same dimension and shape as that of the window 5. The shutter 7 is elastically urged by a spring member accommodated therein (not shown) so as to close the windows 5. On the contrary, if the shutter 7 is moved against the force of the spring member to abut on the stepped part of the recess portion 6, the access hole 8 aligns with the windows 5 to open them, thereby permitting the magnetic head to access the magnetic disk 2.

The shutter is made of a metal material or synthetic resin. The metal shutter may shave down sliding surfaces of the recess portions 6 by edge portions of the shutter 7 on sliding movement of the shutter 7 to provide shavings of the synthetic resin casing 1. The shavings may adhere to the surfaces of the magnetic disk 2 to readily cause recording and reproducing errors. In order to prevent such errors, the clearance is increased between the cartridge casing 1 and the shutter 7. In this case, foreign substance easily enters from the outside into the casing 1 through the clearance. Accordingly, foreign substances will adhere to the magnetic disk surfaces to also cause recording and reproducing errors.

On the contrary, the synthetic resin shutter can eliminate the problem pertaining to the shavings. Accordingly, it is possible that the shutter 7 is so moulded as to closely and elastically ride astride the recess portions 6, thereby preventing the foreign substances from entering into the casing 1 through the shutter portion.

The shutter 7 is made by the manufacturing apparatus shown in FIGS. 23 and 24. The manufacturing apparatus includes a stationary mould 11, a pair of side slide moulds 12, a core 13 to be disposed between the side slide moulds 12 and 12, a pair of side locks 14, a cavity 15 for the shutter and an ejecting pin 16 slidably disposed in the core 13. The letter Z designates the mould clamping direction.

In FIG. 23, the stationary mould 11, the side slide moulds 12, and the core 13 are clamped together as to define the cavity 15 in the moulding operation. The side slide mould 12 abuts at a tapered portion 12a thereof against a tapered portion 14a of the slide lock 14 to clamp the moulds together under an appropriate clamping force.

The moulds are held with a clamping force being applied thereto in the direction Z, and the synthetic resin is injected into the cavity 15 by means of an injection means (not shown) to provide the mouldings. After cooling of the mouldings, the side slide moulds 12, 12 are separated from each other. The moulded shutter 7 mounted on the core 13 is ejected therefrom by means of the ejecting pin 16.

In this conventional manufacturing apparatus, the force applied to each slide lock 14 and 14 may be ununiform, or abutting force against the core 13 from one side slide mould 12 may differ from that from the other side slide mould 12 due to dispersion of manufacturing accuracy. If the abutting forces differ from each other, since the core 13 is thin (about 2.8 mm), the core 13 may incline towards either side thereof As a result, the side plates 9a and 9b of the shutter 7 differ from each other in the thickness thereof. Further, the molten resin enters between the side slide mould 12 and the core 13, which are abutted to each other, with a lower abutting force to provide the mouldings with moulding flash.

Further, the core 13 is provided therein with a small straight bore for the ejecting pin 16. The core has, for example, a thickness of about 2.8 mm and a length of about 35 mm. Therefore, it is hard to provide a small straight bore (for example, 1.5 mm diameter) for the core 13 from a processing technical point of view.

The ejecting pin 16 pushes the moulded shutter 7 at an inner wall surface of the connecting member 10 thereof to remove it from the core 13. As a result, a part of the connecting member 10 projects outwards or a moulding flash projects inwards from the inner wall surface of the connecting member 10. These projections will deteriorate the slidability of the shutter 7.

In order to overcome the problems pertaining to such projections, it is preferable to take a long time to cool the mouldings (shutters 7) and to eject them after complete curing thereof. However, accordingly the total time period for the moulding operation (moulding cycle) is prolonged.

As described above, the slide movement of the shutter 7 is limited by the stepped parts of the recess portions 6 of the casing 1. However, if the side plates 9a and 9b of the shutter 7 extend apart from each other to widen an opening end A, the shutter 7 can slide beyond the stepped part (FIG. 25). Therefore, the hole 8 will not align with the windows 5 thus preventing the head from entering into the windows 5.

Even though the side plates 9a and 9b extend parallel to each other on the moulding operation, repeated usage of the shutter 7 causes that the side plates 9a and 9b to spread apart from each other to widen the opening end A, as shown in FIG. 25. Further, the widened opening end A abuts against an insert slit of the disk driving apparatus to prevent it from entering into the slit.

Furthermore, if the side plates 9a and 9b are moulded to extend too close to each other to produce a narrow opening A, sliding resistance between the shutter 7 and the recess portion 6 becomes so large as to deteriorate the slidability of the shutter 7 (FIG. 26).

A conventional shutter is formed to be of a U-shaped cross section by bending a thin metal plate, for example, a stainless steel plate of a thickness of 0.2 mm. However, it is difficult from the bending process to obtain a higher accuracy in the dimension of the shutter. Further, the metal shutter may readily shave down the synthetic resin casing and may be readily detached from the casing on impact if dropped. For these reasons, it is proposed that the shutter be formed integrally by means of injection moulding of a synthetic resin.

The moulds used in the injection moulding are so arranged, as shown in FIG. 27, that a core 13 is supported at opposite sides thereof by side slide moulds 12 and 12 to define a longitudinal cavity for the shutter, and a stationary mould 11 is mounted on these moulds.

In this arrangement, the supporting force for the core 13 is one perpendicular to the clamping force for clamping these moulds. Namely, such a supporting force is one transmitted through locking blocks and an angular pin and is not sufficient to withstand the injection pressure. During the moulding, if resin is not injected simultaneously into the cavity at both sides of the core 13, the injection pressure of resin at the one side of the core 13 into which resin is injected, at first urges the core 13 towards the other side to become one side plate thick. Accordingly, the other side plate will become thinner and thinner.

As shown in FIG. 28, a cartridge casing 1 of a magnetic disk cartridge to which a conventional synthetic resin shutter 7 is mounted is provided with a recess 17. A pin 18 of a recording/reproducing apparatus enters into the recess 17 to abut against an edge of the shutter 7 and moves it from a closed position (shown in the drawings) to an open position in a direction X to open the hole 8.

For the moulding of such shutter 7, a gate is disposed at an edge of the connecting member 10 adjacent to the hole 8. Therefore, after the moulding, a tapered gate mark 19 is left at the edge of the connecting member 10 to extend towards the recess 17.

The gate mark 19 prevents the pin 18 from engaging with the shutter 7 and may ride on the side plates 9a or 9b of the shutter 7. It becomes impossible to obtain a reliability of the movement of the shutter 7.

SUMMARY OF THE INVENTION

An object of the present invention is to provide a disk cartridge with a shutter which can be moulded without defective moulding and with a high efficiency of moulding, and to provide a manufacturing apparatus for such shutter.

Another object of the present invention is to provide a shutter for disk cartridge, which can be so moulded that the side plates thereof are somewhat in contact with each other or are close to each other to narrow an opening of the shutter, and to provide a manufacturing apparatus for such shutter.

Still another object of the present invention is to provide a manufacturing method for a shutter of a disk cartridge, which has the same thickness in both side plates and a high efficiency of moulding, and to provide a moulding apparatus therefor.

A further object of the present invention is to provide a shutter for a disk cartridge, which can present a high reliability of movement thereof.

To this end, according to one aspect of the present invention, provided is a shutter, made of synthetic resin, for a disk cartridge for closing and opening a head access hole formed in a cartridge casing rotatably accommodating a disk therein, comprising a pair of side plates facing to each other, a connecting plate for connecting ends of the side plates to provide the shutter with a substantially U-shaped cross-section, and an ejection mark formed by an ejection during moulding, disposed on a portion of an outer surface of one of the opposing side plates juxtapositioned to where the side plates join with the connecting plate, referred to as the connecting portion, such that an end surface of the connection plate is at least partially extended.

Further, the first mentioned object of the present invention is to be achieved by an injection moulding apparatus for a shutter, made of synthetic resin, for a disk cartridge for closing and opening a head access hole formed in a cartridge casing rotatably accommodating therein a disk, the shutter comprising a pair of side plates facing to each other and a connecting plate for connecting ends of the side plates to provide the shutter with a substantially U-shaped cross-section, comprising, a stationary mould disposed at a portion corresponding to an outer surface of one of the side plates of the shutter, a movable mould disposed at a portion corresponding to an outer surface of the other side plate, a stationary mould and/or a movable mould disposed at a portion corresponding to an outer surface of the connecting plate, a slide core slidably disposed among the moulds for forming inner surfaces of the side plates and of the connecting plate, and ejection means disposed at a portion corresponding to a part of the outer surface of either one of the side plates including at least a part facing a connecting portion between the side plate and the connecting plate.

Accordingly, no ejection means is provided within the slide core, and the ejection means abuts on the most thickened part of the shutter, namely the part corresponding to a connecting part of the connecting plate. Therefore, even though the cooling time is not sufficient, the shutter is hardly deformed on moulding. Furthermore, since the stationary mould, the slide core and the movable mould are placed in a clamping position in order and then the slide core is directly supported by means of the mould clamping force, the slide core is hardly deflected on mould clamping. It becomes possible to mould the shutter to a uniform thickness, thereby preventing the moulding flash from being generated in the shutter.

The second mentioned object of the present invention is to be achieved by an injection moulding apparatus for a shutter, made of synthetic resin, for a disk cartridge for closing and opening a head access hole formed in a cartridge casing rotatably accommodating therein a disk the shutter comprising a pair of side plates facing each other and a connecting plate for connecting ends of the side plates to provide the shutter with a substantially U-shaped cross-section, comprising, a stationary mould disposed at a portion corresponding to an outer surface of one of the side plates of the shutter, a movable mould disposed at a portion corresponding to an outer surface of the other side plate, a stationary mould and/or a movable mould disposed at a portion corresponding to an outer surface of the connecting plate, and a slide core slidably disposed among the moulds for forming inner surfaces of the side plates and of the connecting plate, a draft angle defined by opposite side surfaces of the slide core being held between 2° and 8°.

Accordingly, due to the difference of cooling rate, the shutter is so moulded that the free ends of the side plates, which define the opening end, become in somewhat contact with each other or come close to each other to narrow the opening end.

The third mentioned object of the present invention is to be achieved by an injection moulding apparatus for a shutter, made of synthetic resin, for a disk cartridge for closing and opening a head access hole formed in a cartridge casing rotatably accommodating therein a disk the shutter comprising a pair of side plates facing each other and a connecting plate for connecting ends of the side plates to provide the shutter with a substantially U-shaped cross-section, comprising a stationary mould disposed at a portion corresponding to an outer surface of one of the side plates of the shutter, a movable mould disposed at a portion corresponding to an outer surface of the other side plate, a stationary mould and/or a movable mould disposed at a portion corresponding to an outer surface of the connecting plate, and a slide core slidably disposed among the moulds for forming inner surfaces of the side plates and of the connecting plate, a part of the slide core adapted to be clamped up between the stationary moulds and the movable moulds.

Further, the third mentioned object of the present invention is also to be achieved by a method for injection moulding a shutter, made of synthetic resin, for a disk cartridge for closing and opening a head access hole formed in a cartridge casing rotatably accommodating therein a disk, the shutter comprising a pair of side plates facing each other and a connecting plate for connecting ends of the side plates to provide the shutter with a substantially U-shaped cross-section, comprising the following steps of disposing either one of a movable mould and a stationary mould at a portion corresponding to an outer surface of one of the side plates of the shutter, disposing the other one of the moulds at a portion corresponding to an outer surface of the other side plate, disposing either one of a movable mould and/or a stationary mould at a portion corresponding to an outer surface of the connecting plate of the shutter, disposing a slide core between the stationary moulds and the movable moulds for forming inner surfaces of the side plates and of the connecting plate, and sliding the slide core in a direction perpendicular to a direction of clamping of the stationary moulds and the movable moulds.

Accordingly, the slide core for forming a space defined by the side plates of the shutter is slidable in a direction perpendicular to a mould opening direction. It becomes possible to directly support the slide core by means of the mould clamping force, thereby effectively preventing the side plates from differing from each other in thickness and improving the productivity of the shutter moulding.

The fourth mentioned object of the present invention is to be achieved by a shutter, made of synthetic resin, for a disk cartridge for closing and opening a head access hole formed in a cartridge casing rotatably accommodating therein a disk, comprising a pair of side plates facing each other, a connecting plate for connecting ends of the side plates to provide the shutter with a substantially U-shaped cross-section, opposite edges one on which a shutter opening member of a recording/reproducing apparatus is adapted to abut, and a Further, the fourth mentioned object of the present invention is also to be achieved by an injection moulding apparatus for a shutter, made of synthetic resin, for a disk cartridge for closing and opening a head access hole formed in a cartridge casing rotatably accommodating therein a disk, the shutter comprising a pair of side plates facing each other and a connecting plate for connecting ends of the side plates to provide the shutter with a substantially U-shaped cross-section, comprising, a first injection gate disposed at a portion corresponding to one end of the shutter on which a shutter opening member of a recording/reproducing apparatus is adapted to abut, and a second injection gate disposed at a portion corresponding to the other edge of the shutter opposite to the one edge thereof, the second injection gate having a passage cross-section larger than that of the first injection gate.

Accordingly, no gate mark is formed on the edge of the shutter, on which the shutter opening member of the recording/reproducing apparatus is adapted to abut, or if any, gate mark is so small that the shutter opening member is prevented from riding on such edge. Therefore, the shutter is moved certainly to open the head access hole.

Other objects and features of the present invention will be more apparent from the following description of the preferred embodiments described with referring to the accompanying drawings

DETAILED DESCRIPTION OF PREFERRED EMBODIMENTS

Figure 1:
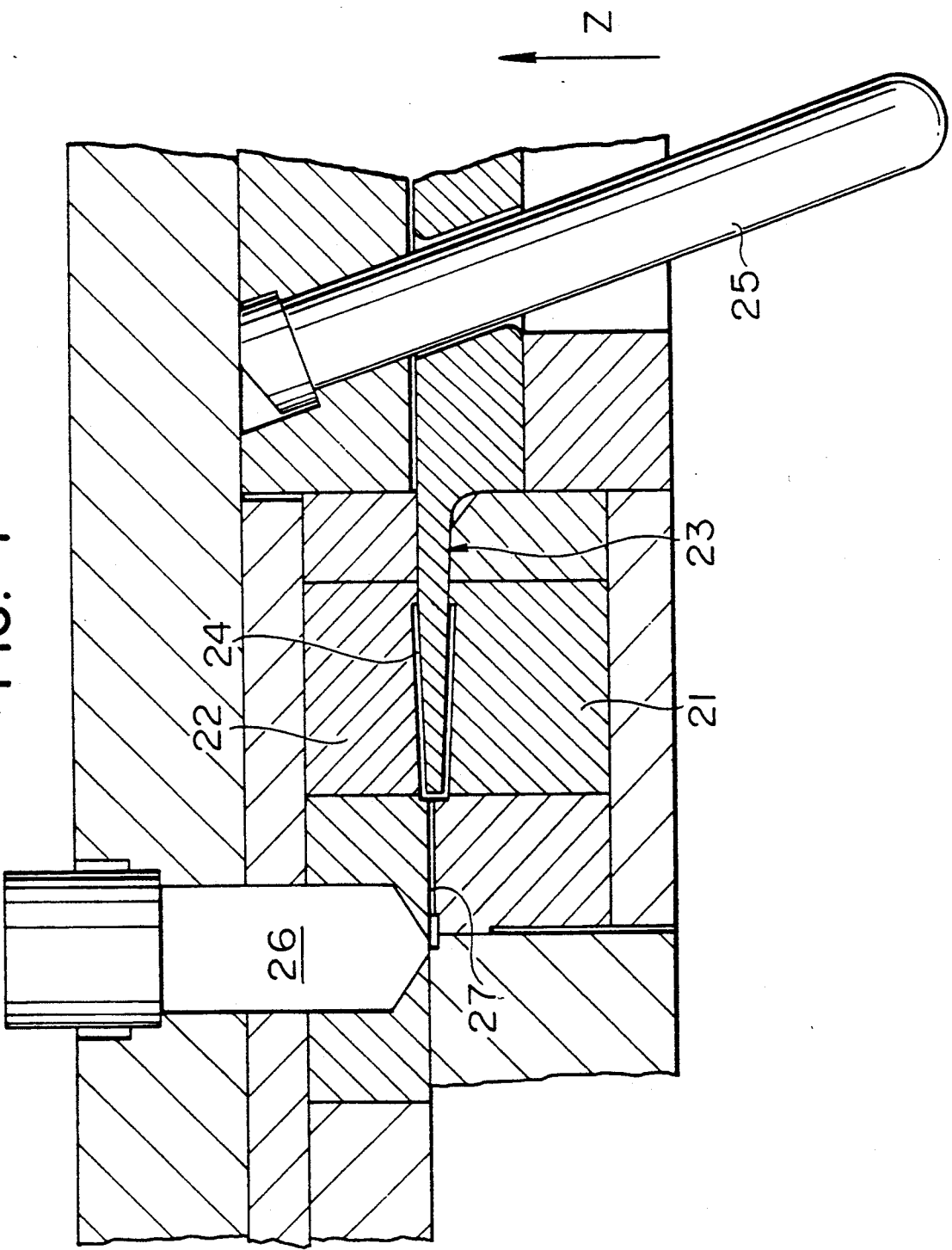
FIG. 1 is a sectional view showing an injection moulding apparatus for a shutter according to an embodiment of the invention.
Figure 2:
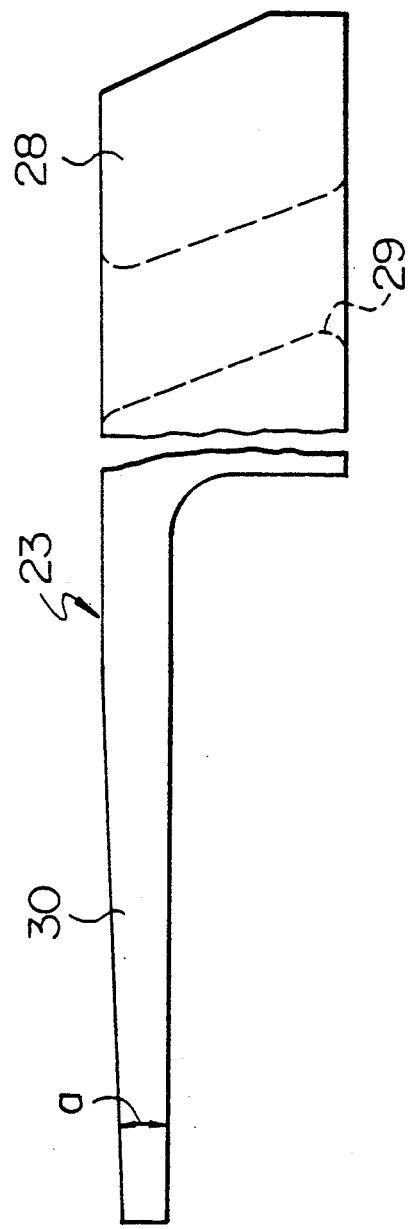
FIG. 2 is a fragmentary side view showing a slide core in FIG. 1.
Figure 3:
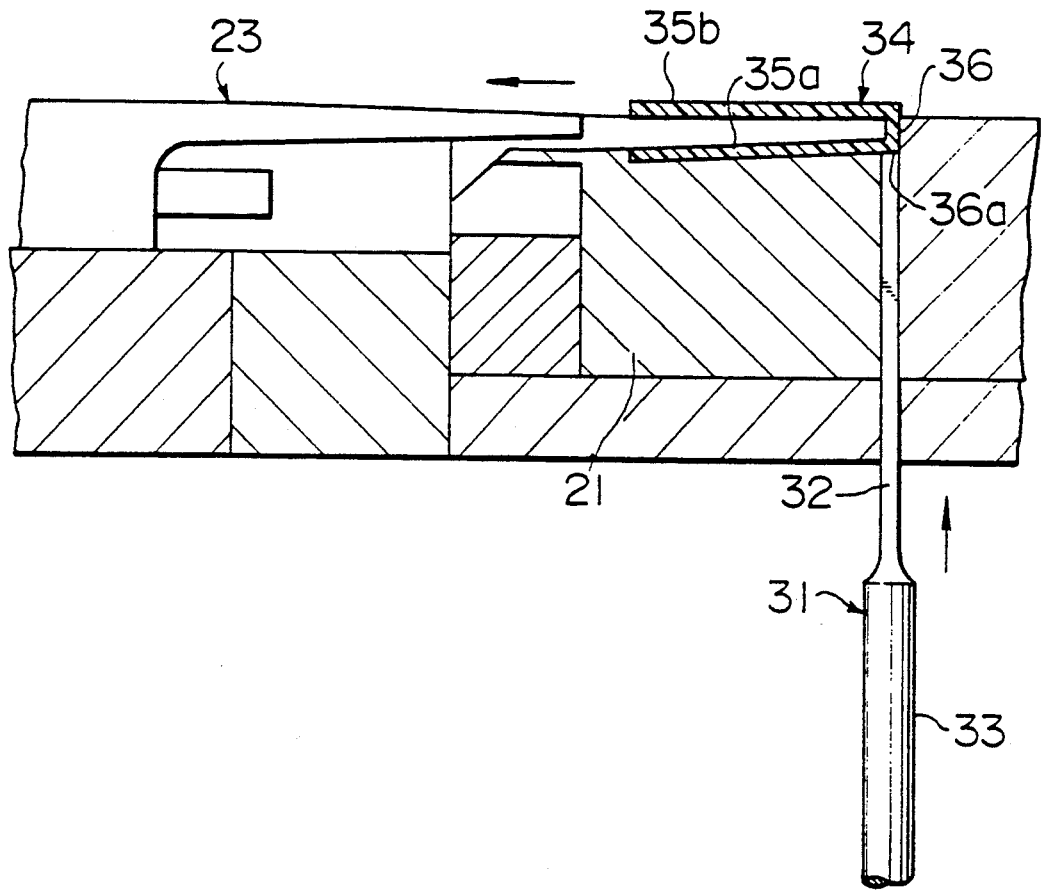
FIG. 3 is a sectional view of the apparatus shown in FIG. 1 with moulded shutter, without a movable mould and a slide core.

Referring to FIGS. 1 to 3, an injection moulding apparatus for a shutter includes a movable mould 21, a stationary mould 22 disposed above the movable mould 21, and a slide core 23 disposed between the moulds 21 and 22 to define therebetween a cavity 24 for a shutter. The mould 22, the slide core 23 and the mould 21 are to be clamped up in order in a mould clamping direction Z. The apparatus further includes an angular pin 25 and a resin injection means 26.

As shown in detail in FIG. 2, the slide core 23 includes a base portion 28 and a body portion 30 extending from the base portion 28, which is to be disposed between the moulds 21 and 22 and is tapered to have a draft angle a from 32 2° to 8°. The base portion 28 is provided with a bore 29 through which the angular pin 25 extends. The slide core 23 can slide along the angular pin 25 during mould separation as described below.

The injection means 26 injects molten synthetic resin, e.g. polypropylene, as a moulding compound into the cavity 24 through a passage 27.

After the injection is completed and a moulded object, i.e. a shutter, is cooled properly, as the movable mould 21 opens, it moves downward relative to the stationary mould 22, and the slide core 23, which moves downward together with the movable mould 21, is guided along the angular pin 25 so as to become separated from the fixed mould 22.

As shown in FIG. 3, as a result of mould opening, a moulded shutter 34 is retained on the movable mould 21. The shutter 34 has opposite side plates 35a and 35b, and a connecting plate 36 connecting ends of the side plates 35a and 35b. An ejection pin 31 consists of an ejecting plate portion 32 and a cylindrical body portion 33 from which the ejecting plate portion 32 extends. The ejection pin 31 is so disposed that an end of the ejecting plate portion 32 faces towards and abuts on a portion of the side plate 35a under a connecting portion 36a between the side plate 35a and the connecting plate 36. The ejection Pin 31 pushes up the shutter 34 to remove it from the movable mould 21.

Figure 4:
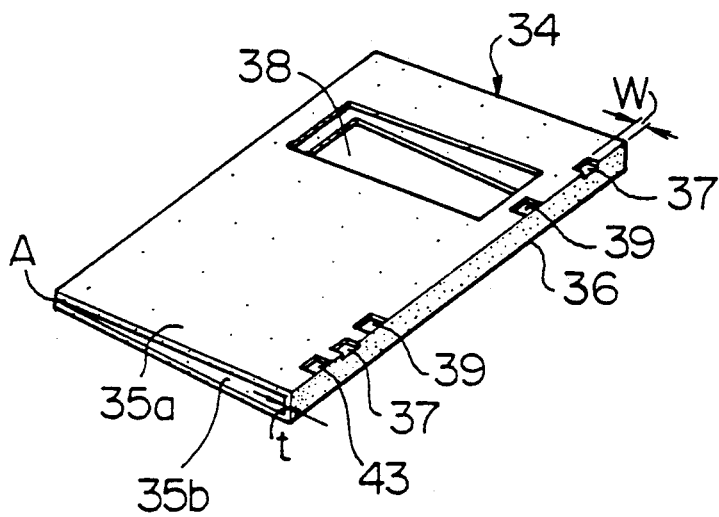
FIG. 4 is a perspective view showing a shutter formed by the apparatus shown in FIG. 1.

The shutter 34 is, as shown in FIG. 4, is provided on the side plate 35a thereof with two elongate ejection marks 37 and 37 which are somewhat recessed and each of which is placed on a portion including at least the connecting portion 36a. The ejecting plate portion 32 is so designed that a width W of the ejection mark 37 become substantially identical to a thickness t of the connecting plate 36. The ejecting plate portion 32 does not completely face to the connecting portion 36a only, but extend over the connecting portion 36a and the side plate 35a. Accordingly, since the shutter can be ejected by means of pushing up a portion thereof including at least the connecting portion 36a by the ejection pin 31, the connecting plate 36 withstands an ejecting force from the ejection pin 31, as clearly seen from FIG. 3, on the ejection to prevent the shutter from deforming and to reliably eject it from the mould 21.

If a draft angle a defined by opposite surfaces of the body portion 30 of the slide core 23 is held between 2° and 8°, due to the cooling rate difference, the other ends of the side plates 35a and 35b come into somewhat contact with or close to each other to narrow an opening end A of the shutter 34 which defined by such other ends. Such shutter can exert a good braking ability and a good slidability thereof when mounted onto a cartridge casing.

Figure 5:
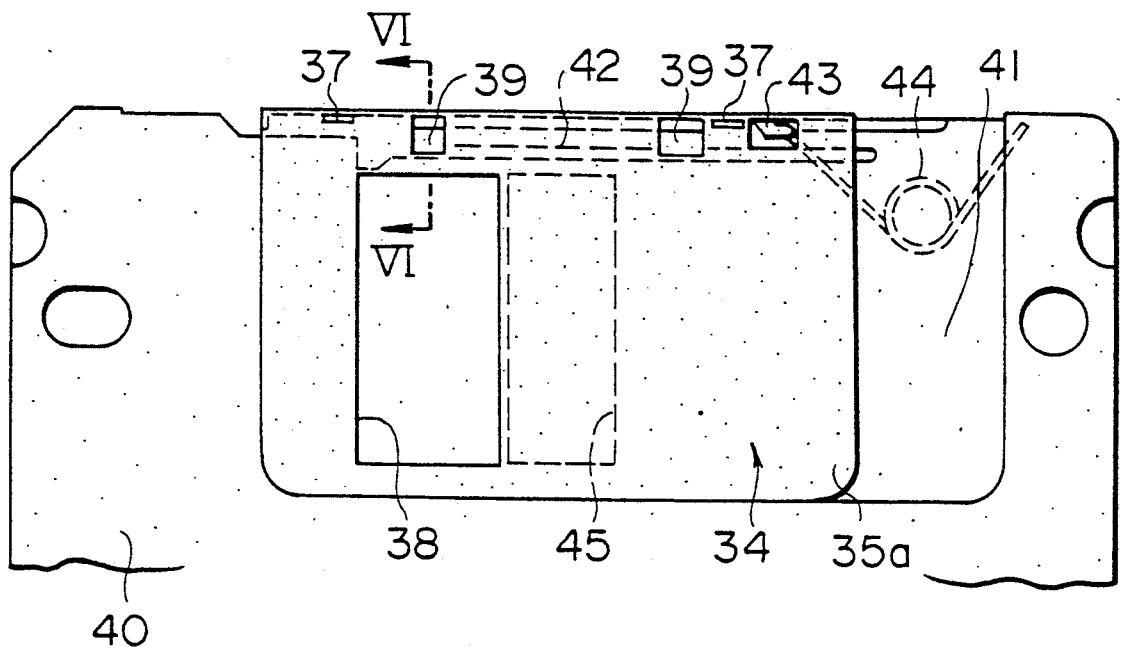
FIG. 5 is a fragmentary plan view showing a magnetic disk cartridge to which the shutter shown in FIG. 4 is mounted.
Figure 6:
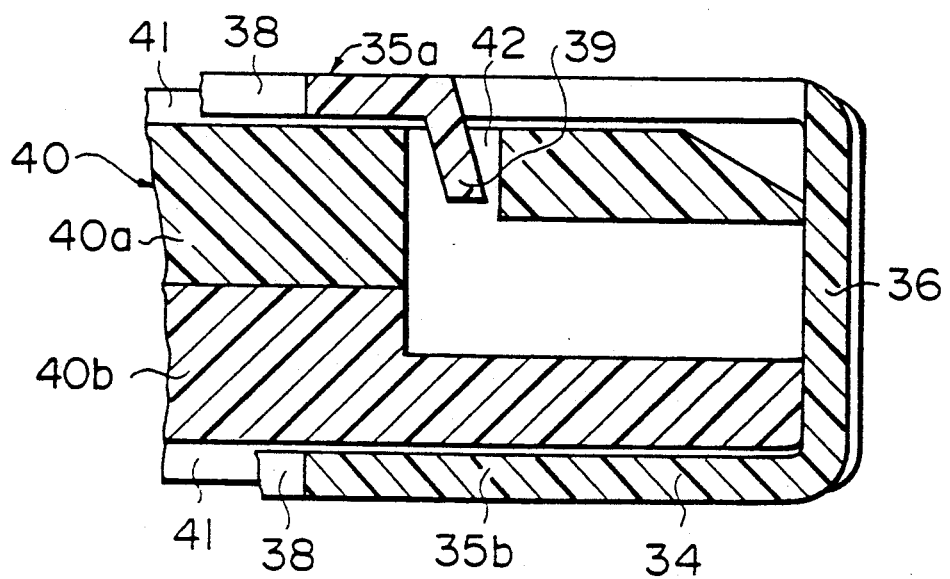
FIG. 6 is an enlarged sectional view taken along the lines IV—IV in FIG. 5.
Figure 7:
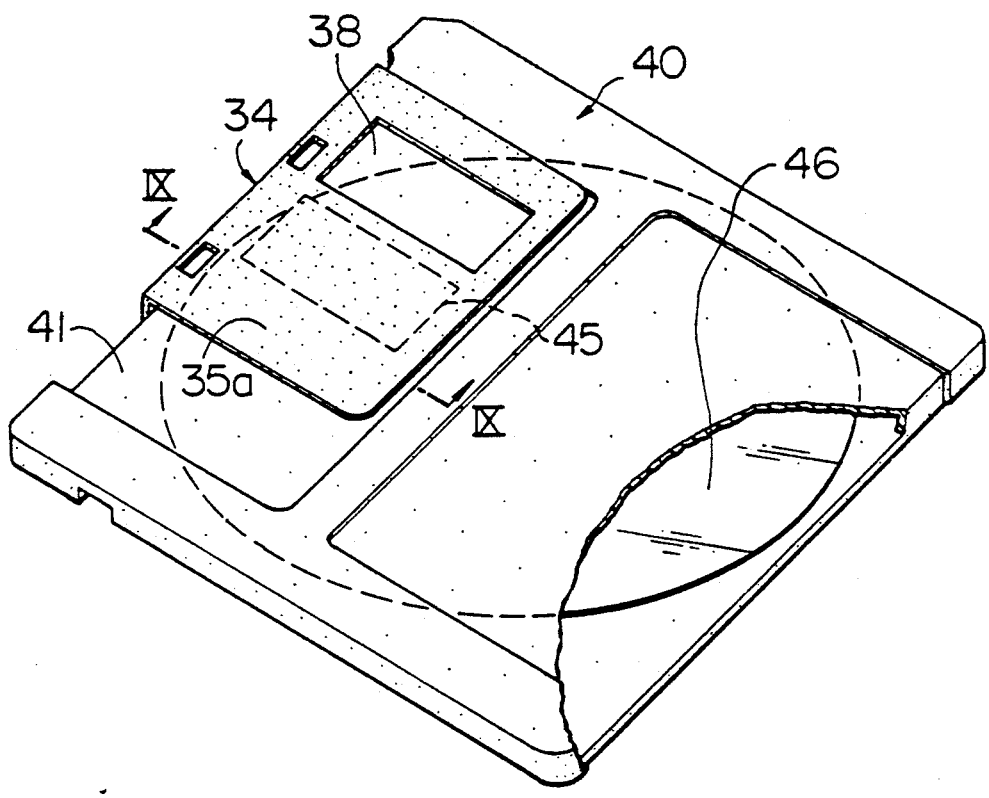
FIG. 7 is a perspective view showing a magnetic disk cartridge to which a shutter according to an embodiment of the invention.

The cartridge casing 40, as shown in FIGS. 5 and 6, consists of two casing halves 40a and 40b. Each of the halves 40a and 40b is provided on a predetermined portion thereof with a recess portion 41 which restricts the movement of the shutter within a predetermined range. A guide groove 42 is provided in the casing 40 to extend on the casing half 40a. A guide claw 39 extending inwardly from the side plate 35a at a predetermined inclination angle cooperates with the guide groove 42 to control the sliding movement of the shutter 34. The shutter 34 is elastically urged to close a magnetic head access hole 45 by means of a spring force of a spring 44. The spring 44 is engaged at one end thereof with a projection 43 Projecting from an inner surface of the connecting plate 36 and at the other end thereof with an inner surface of the casing 40.

According to this embodiment, as described above, since the opening end A of the shutter 34 is narrowed, the shutter 34 is tightly and slidably mounted on the recess portion 41 as well as is certainly stopped at opposite stepped portions, i.e. both ends of the recess portion 41. These features can be obtained by the shutter having a guide claw which projects from an inner surface of the connecting plate 36, instead of the guide claw 39.

Referring to FIGS. 7 to 12, a magnetic disk cartridge according to another embodiment of the invention includes a cartridge casing 40, a magnetic disk 46 rotatably accommodated within the casing 40, and a shutter 34. The casing 40 consists of two casing halves 40a and 40b. The casing 40 is provided on opposite surfaces thereof with recess portions 41 and on an end face adjacent to the recess portions 41 with a guide groove 42. Further, the casing 40 is provided on the recess Portions 41 with a head access hole 45 through which a magnetic head accesses the magnetic disk 46.

Figure 8:
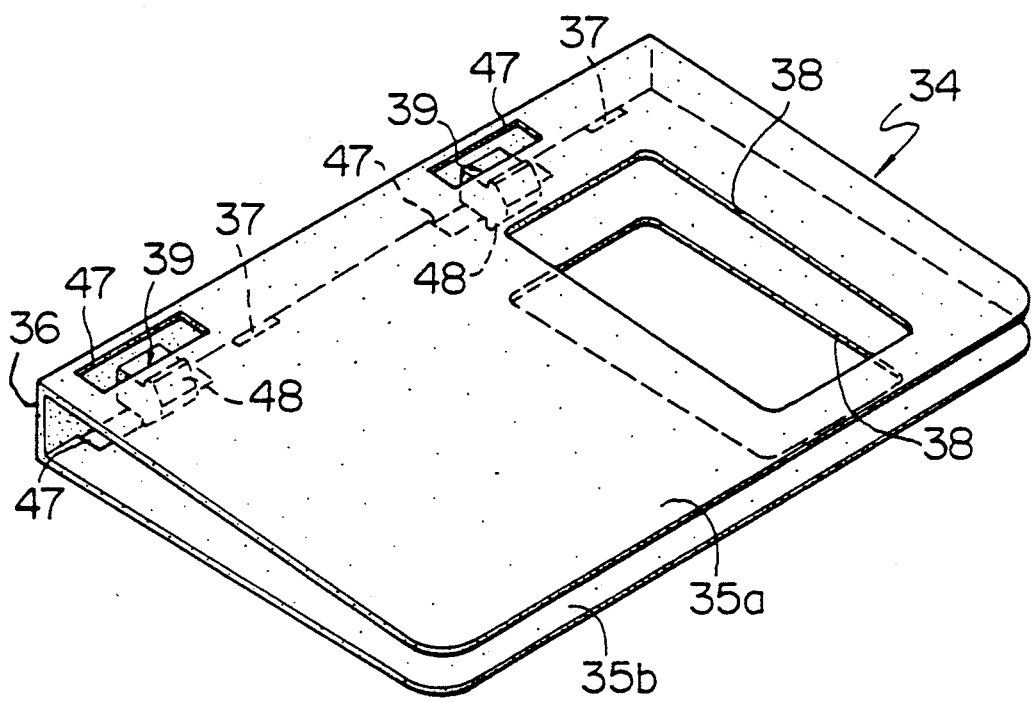
FIG. 8 is an enlarged sectional view showing the shutter shown in FIG. 7.
Figure 9:
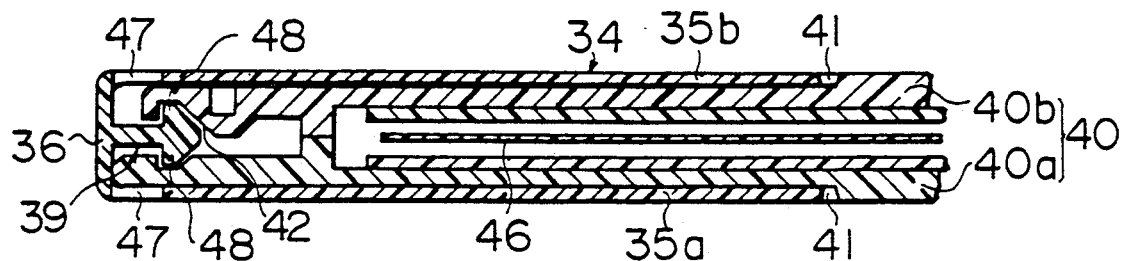
FIG. 9 is an enlarged sectional view taken along the lines IX—IX in FIG. 7.

In this embodiment, as shown in FIGS. 8 and 9, two guide projections 39 are provided in the connecting plate 36 to extend perpendicular thereto. Both ends 48 and 48 of each of the guide projections 39 expand outwards in opposite directions perpendicular to the guide projections 39. Both ends 48 are received within the guide groove 42 so as to cooperate therewith to control the slide movement of the shutter 34.

Figure 10:
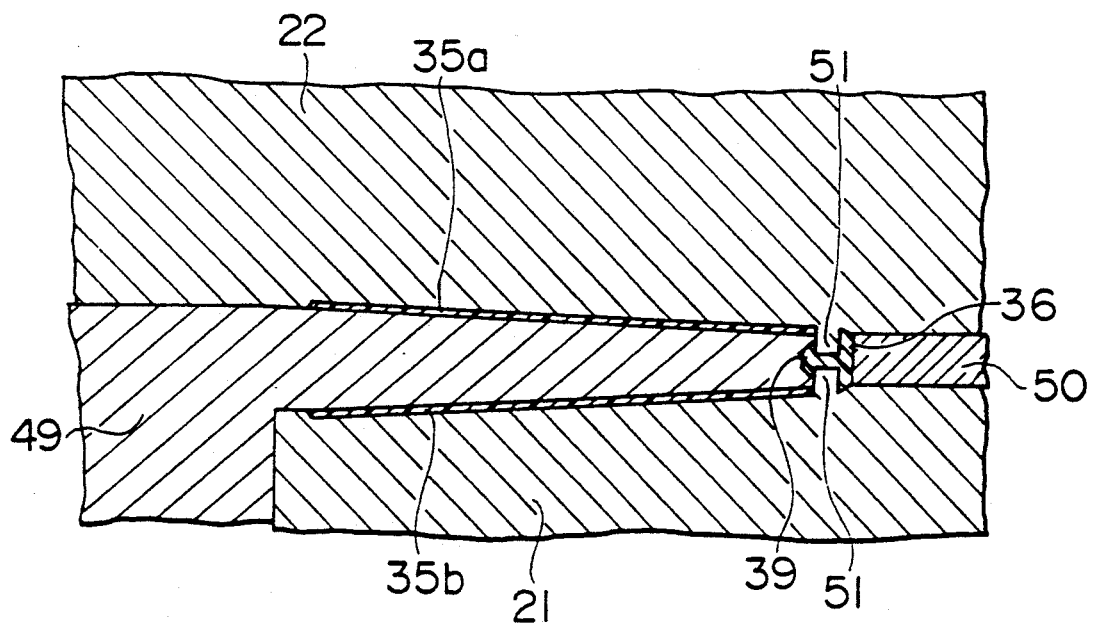
FIG. 10 is a fragmentary sectional view showing mounds when clamped.
Figure 11:
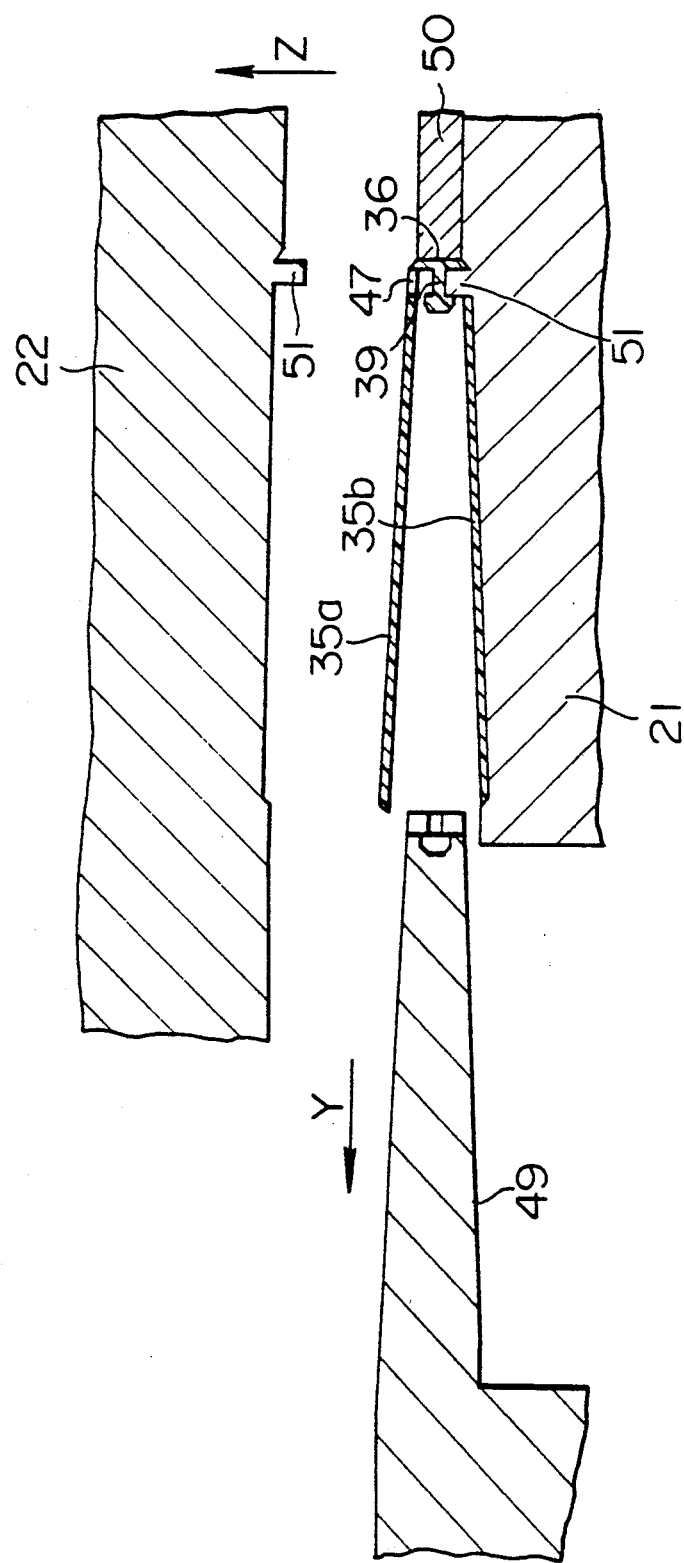
FIG. 11 is a fragmentary sectional view showing the moulds when opened.
Figure 12:
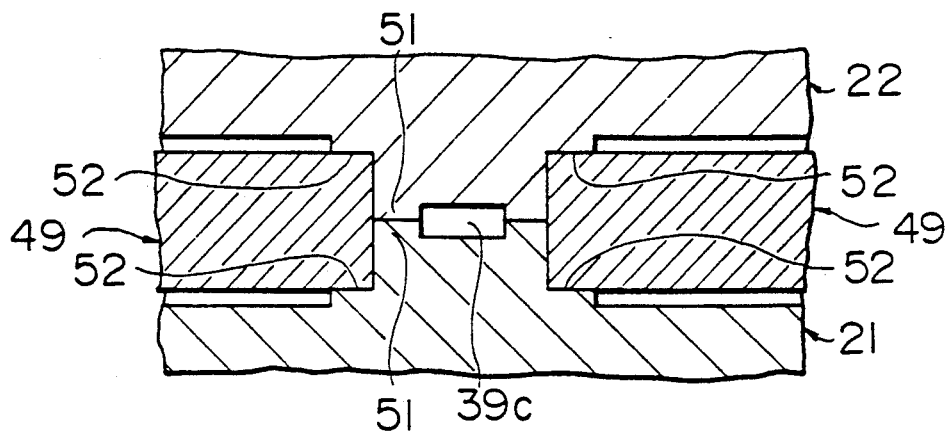
FIG. 12 is a fragmentary sectional view showing a part of moulds corresponding to a guide claw portion of the shutter.

An arrangement of moulds for manufacturing this shutter 34 will be explained hereinunder with reference to FIGS. 10 to 12.

There are provided a movable mould 21, a slide core 49 and a stationary mould 22 A reference numeral 50 designates a runner block. As is clear from FIGS. 1 and 11, the movable mould 21 is moved to open the mould in a direction reverse to the mould clamping direction Z. The slide core 49 is adapted to move along the angular pin 25 to be removed from the movable mould 21 in a direction Y perpendicular to the mould clamping direction Z.

The movable and the stationary moulds 21 and 2 are provided with projections 51 and 51, respectively. As clearly shown in FIG. 12, when clamped, these projections 51 and 51 abut to each other to form therebetween a cavity 39c for the guide projection 39. Accordingly, the shutter 34 is provided with windows 47 corresponding to the guide Projections 39, which are formed by the projections 51. Further, the moulds 21 and 22 are provided with recess portions 52 and 52 for directly receiving a part of the slide core 49 (FIG. 12). The mould clamping force applied to the moulds 21 and 22 is directly transmitted to the slide core 49 so as to retain a tapered end portion of the slide core 49. Accordingly, the slide core is prevented from being deflected by means of pressure of injected molten resin.

This mould arrangement is applicable not only to the above-mentioned shutter which includes guide projections projected from the connecting plate 36, but also to the shutter which includes guide projections projected from the side plate 35a or 35b, as shown in FIG. 6.

Figure 13:
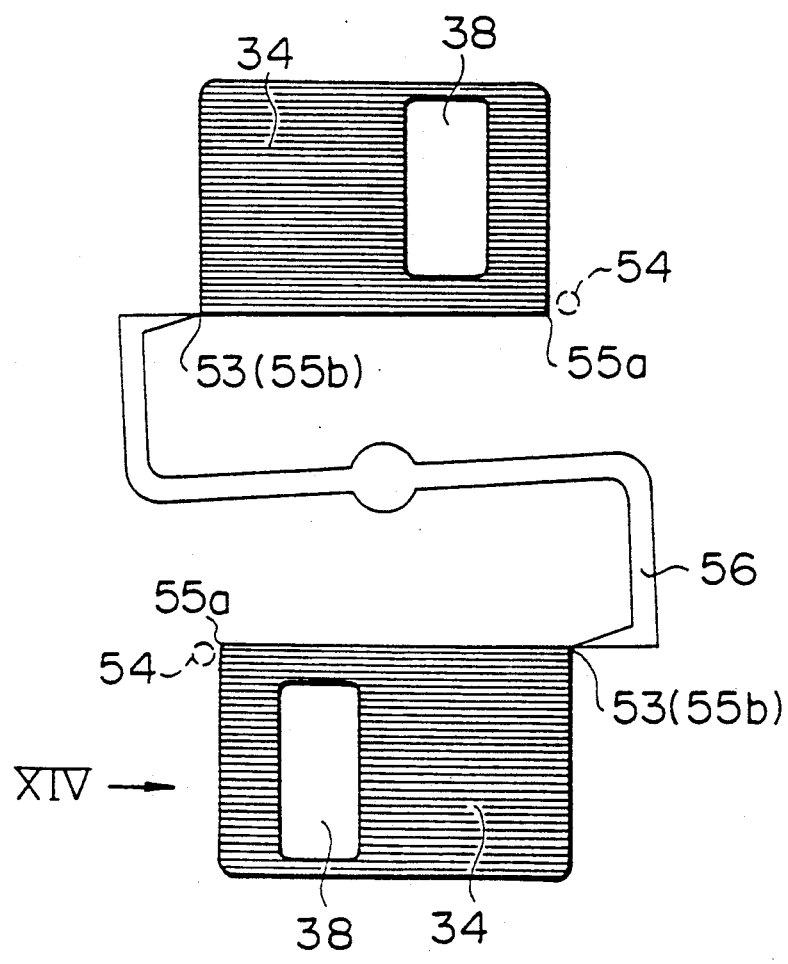
FIG. 13 is a plan view showing two-impression moulded shutters formed in accordance with an embodiment of the invention.
Figure 14:
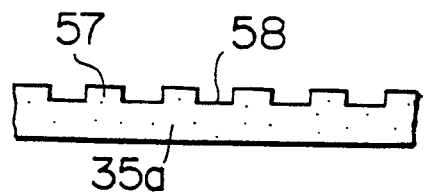
FIG. 14 is a fragmentary side view from the arrow XIV in FIG. 13.
Figure 15:
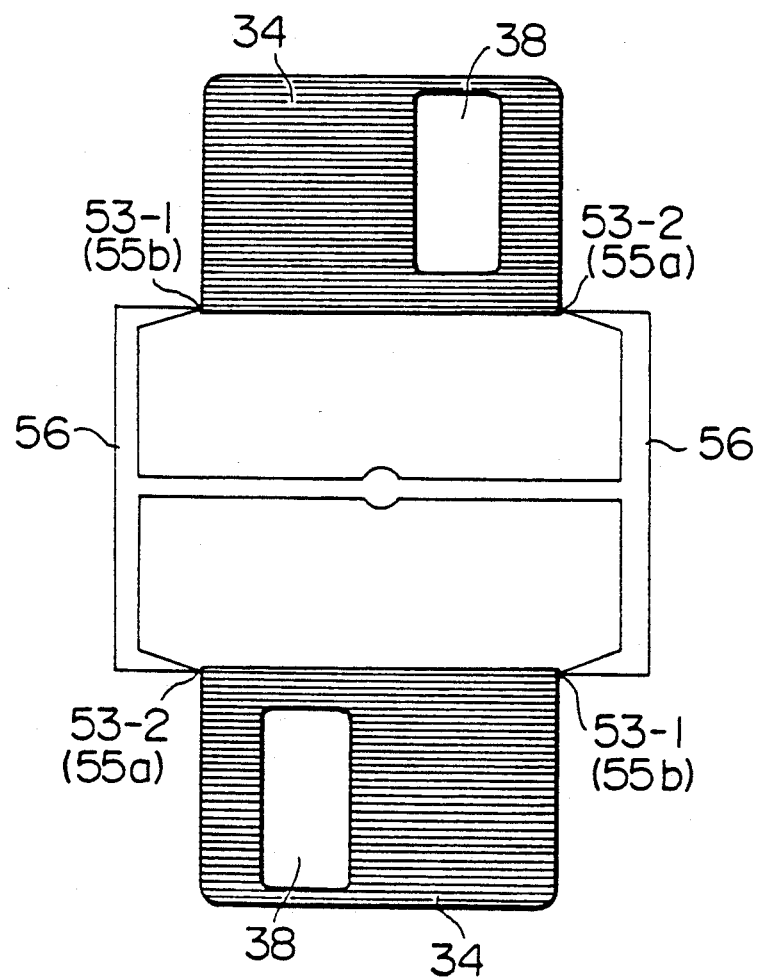
FIG. 15 is a plan view showing two-impression moulded shutters formed in accordance with another embodiment of the invention.
Figure 16:
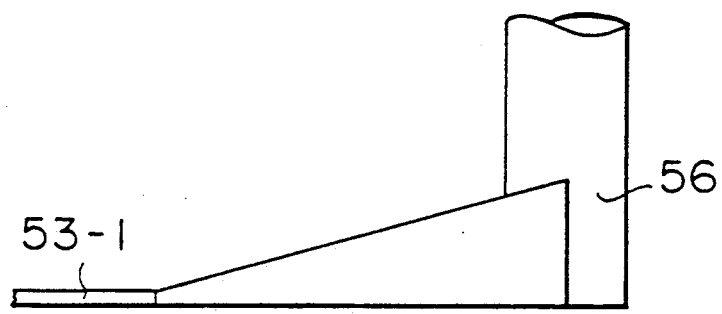
FIG. 16 is an enlarged plan view showing one gate of the moulds.
Figure 17:
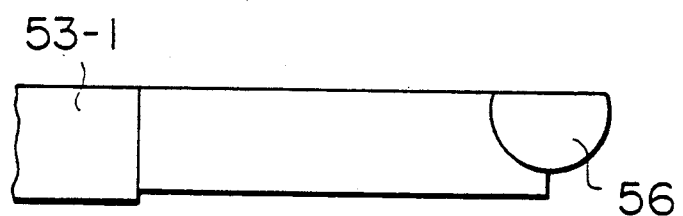
FIG. 17 is an enlarged side view showing the gate shown in FIG. 16.
Figure 18:
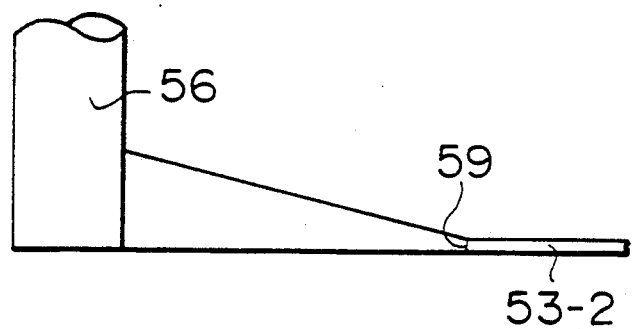
FIG. 18 is an enlarged plan view showing the other gate of the moulds.
Figure 19:
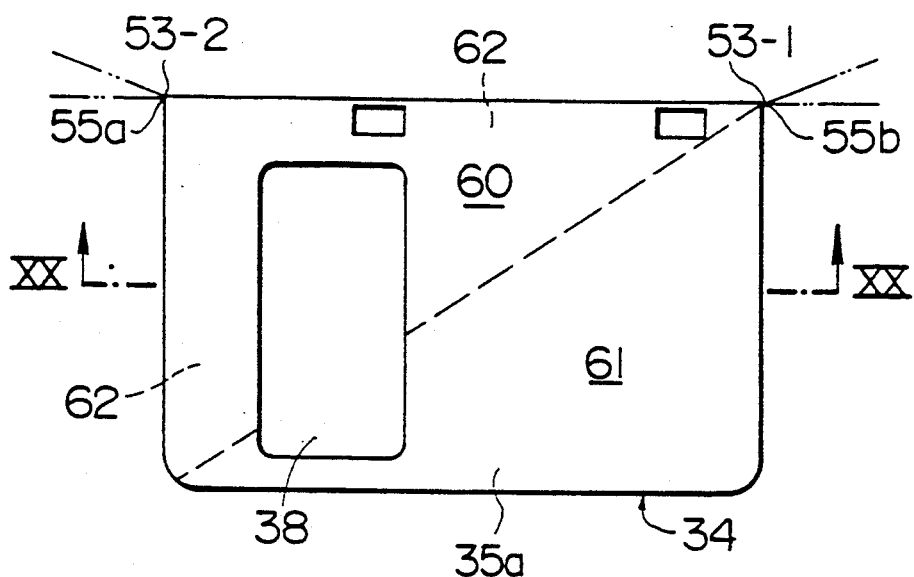
FIG. 19 is a plan view showing the shutter shown in FIG. 15.
Figure 20:
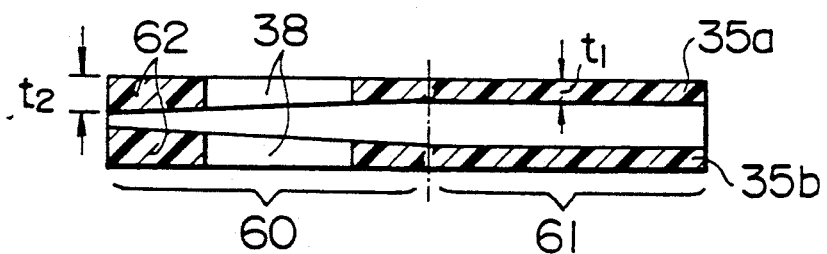
FIG. 20 is a sectional view taken along the lines XX—XX in FIG. 19.

Referring to FIGS. 13 and 14, a mould arrangement of an injection moulding apparatus for two-impression according to still another embodiment of the invention include gates 53 through which molten resin flowing in a runner 56 is injected into cavities for the shutters. The gate 53 is so disposed as to communicate at first with a part of the cavity corresponding to an edge 55b of the moulded shutter 34 opposite to an edge 55a thereof to which a shutter opening member 54 of a recording/reproducing apparatus is adapted to abut, namely an edge 55b apart from a hole 38. The gate 53 has a width (a dimension measured in a direction perpendicular to the drawing sheet) substantially identical to a height of the connecting plate 36.

Since only one gate 53 is provided for a shutter, a gate mark is formed only in one edge 55b of the shutter 34, opposite to the other edge 55a to which the shutter opening member 54 is to be abutted. Accordingly, when the shutter 34 is to be moved by means of the member 54, the gate mark never prevents the opening member 54 from engaging with the other edge 55a. The opening member 54 can engage with the edge 55a without riding onto the connecting plate 36, thereby surely moving the shutter to open the head access hole of the cartridge casing.

The shutter 34 is provided at outer surfaces thereof with a plurality of straight projections 57 and of grooves 58 which are alternately formed.

Further, referring to FIGS. 15 to 20, a mould arrangement of an injection moulding apparatus for two-impression according to the other embodiment of the invention includes a first gate 53-1 and a second gate 53-2 for each shutter, through which molten resin flowing in runners 56 is injected into a cavity for the shutter.

The first gate 53-1 is so disposed as to communicate at first with a part of the cavity corresponding to an edge 55b of the moulded shutter 34 opposite to an edge 55a thereof which is adjacent to the hole 38a. The second gate 53-2 is so disposed as to communicate at first with a part of the cavity corresponding to the edge 55a of the moulded shutter 34.

The molten resin is injected into a cavity simultaneously through the first gate 53-1 and the second gate 53-2 to mould the shutter 34. The first gate 53-1 has a cross-sectional area S1 greater than that S2 of the second gate 53-2 (S1>S2). Namely, as apparent from a comparison between FIGS. 16 and 18, the second gate 53-2 is provided with a constriction portion 59 to narrow the cross-sectional area thereof. To the contrary, no constriction portion 59 is provided in the first gate 53-1. The plan shape dimension of the second gate portion is identical to that of the first gage portion shown in FIG. 17.

Accordingly, the gate mark formed on the edge 55a of the moulded shutter is necessarily smaller than that on the edge 55b.

Further, the periphery of the hole 38 is generally deformable under moulding pressure due to a lower rigidity thereof. According to this embodiment, if the injection is so controlled that the moulding pressure is applied to the first gate 53-1 longer and is applied to the second gate 53-2 shorter by means of shortening a gate seal time period, it becomes possible to improve the rigidity in the periphery of the hole 38 to prevent deformation thereof.

The thicknesses in two parts 60 and 61 of the side plate 35a and 35b of the shutter 34 differ from each other, divided by a diagonal line (broken line). The fluidity resistance of molten resin in the part 60 is higher than that in the part 61 because an opening for the hole 38 is formed in the part 60 to generate two parts 62 and 62 of narrow width. In order to overcome the defects caused by such difference of the fluidity resistance, the thickness of the side plate in the part 60 is substantially larger than that in the part 61. Namely, in part 61, the thickness of the side plate is generally uniform and is t1. To the contrary, in the part 60, the thickness of the side plate is gradually increased towards the side end of the shutter. The thickness in the side end of the shutter is t2 which is somewhat greater than t1, and the thickness in the boundary portion between the parts 60 and 61 is t1. Accordingly, it is possible to eliminate generation of a defective moulded shutter.

Incidentally, this shutter 34 is also provided at outer surfaces thereof with a plurality of straight projections and of grooves as the shutter shown in FIG. 13 is.

Figure 21:
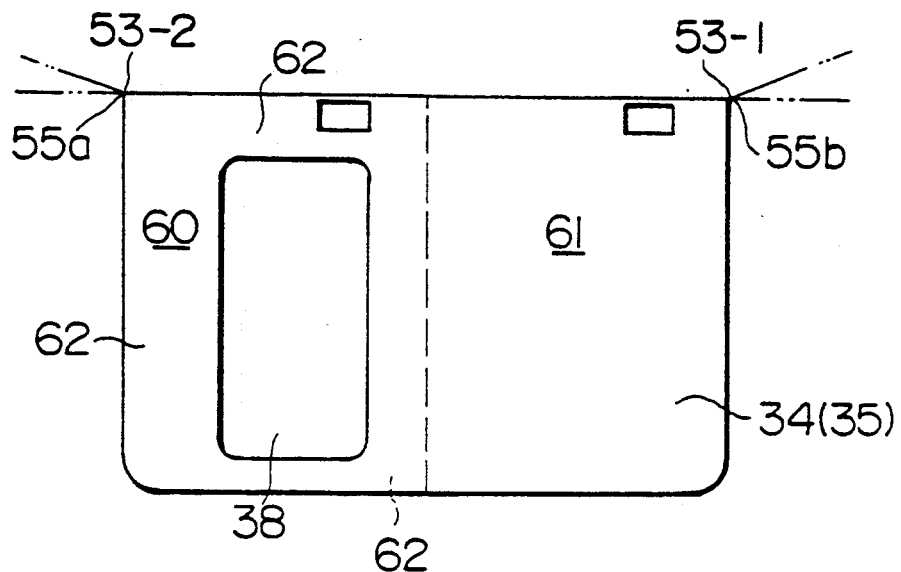
FIG. 21 is a plan view showing a shutter in accordance with still another embodiment of the invention.
Figure 22:
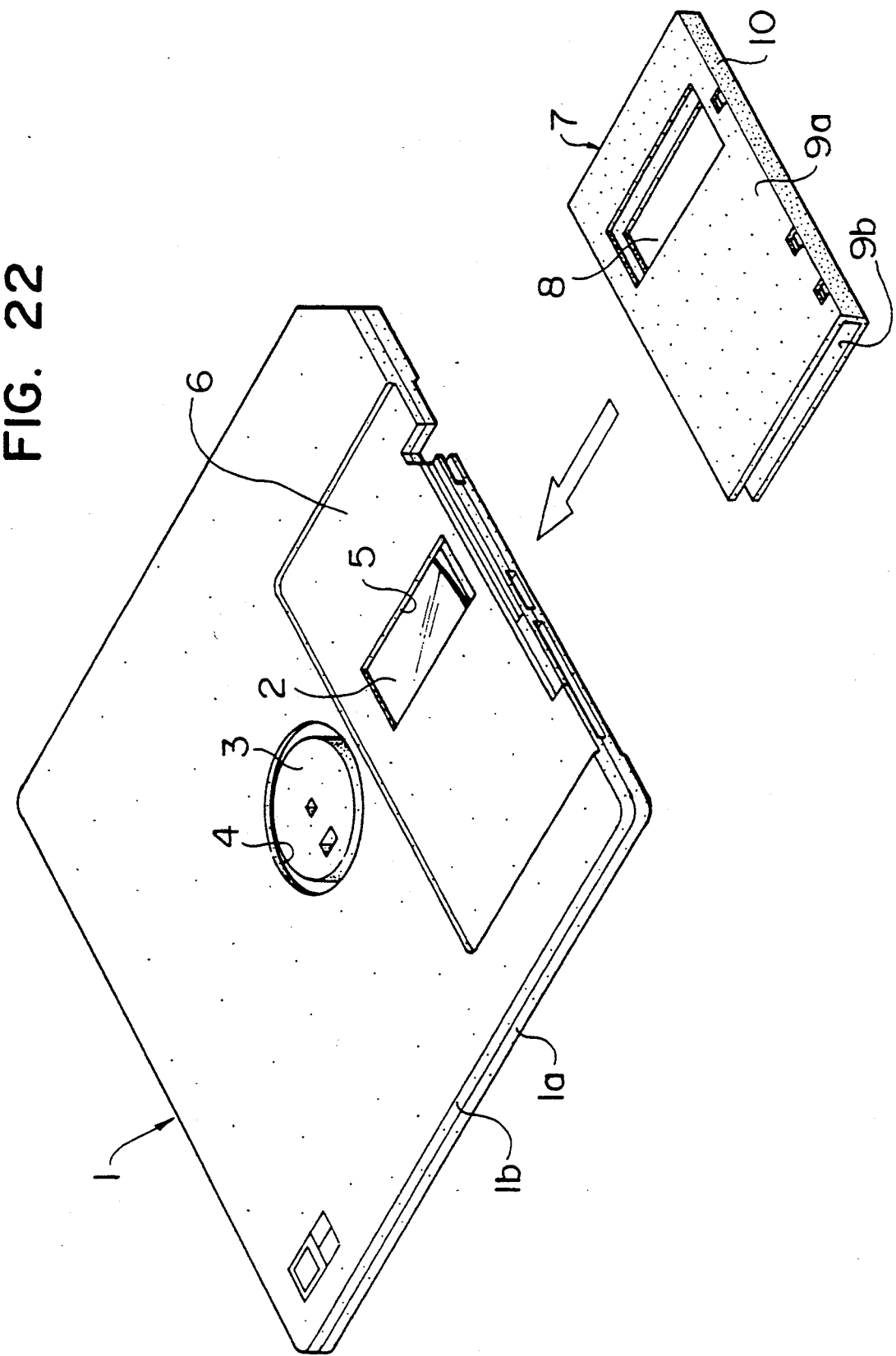
FIG. 22 is a perspective view showing a conventional magnetic disk cartridge.
Figure 23:
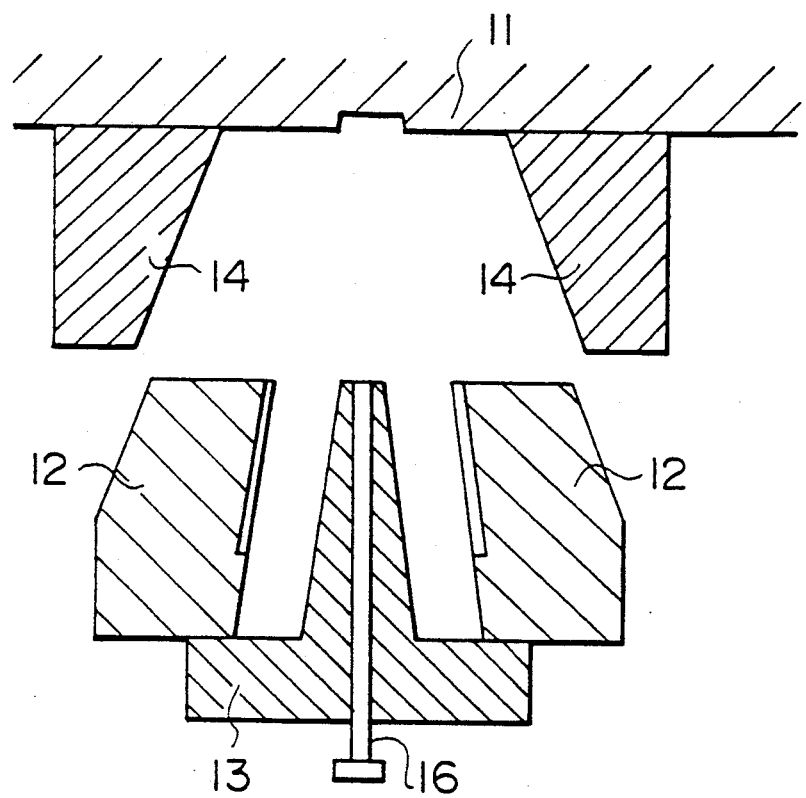
FIG. 23 is a sectional view showing moulds of a conventional moulding apparatus when opened.
Figure 24:
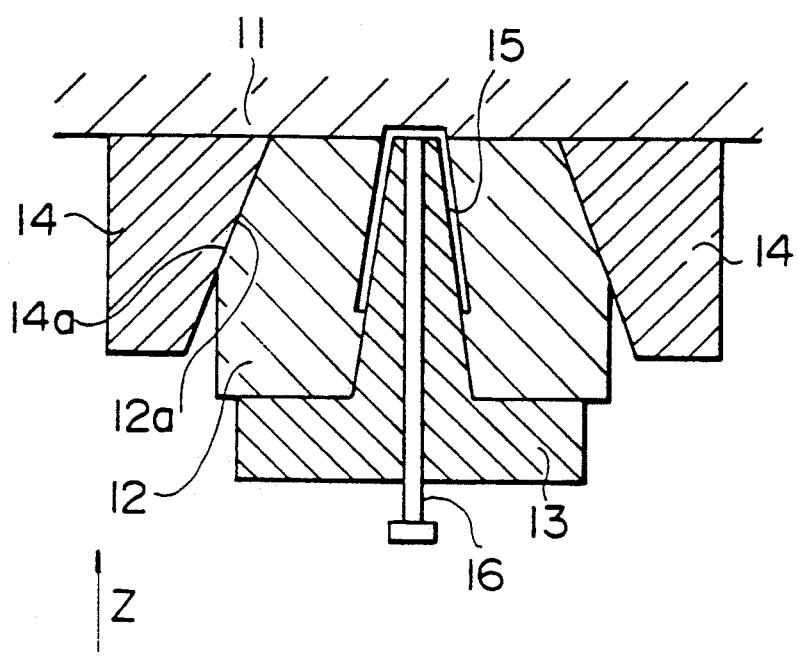
FIG. 24 is a sectional view showing the moulds of the conventional moulding apparatus when clamped.
Figure 25:
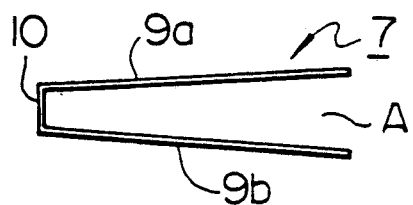
FIGS. 25 and 26 are side views showing conventional shutter, respectively.
Figure 28:
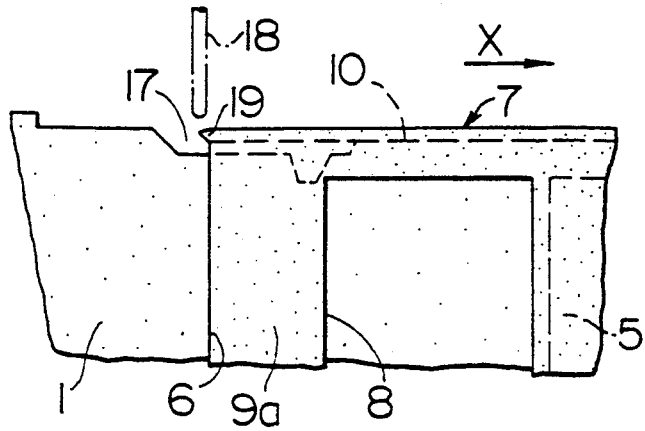
FIG. 28 is a fragmentary plan view showing a conventional disk cartridge.
Figure 26:
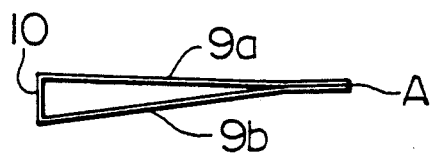
Figure 27:
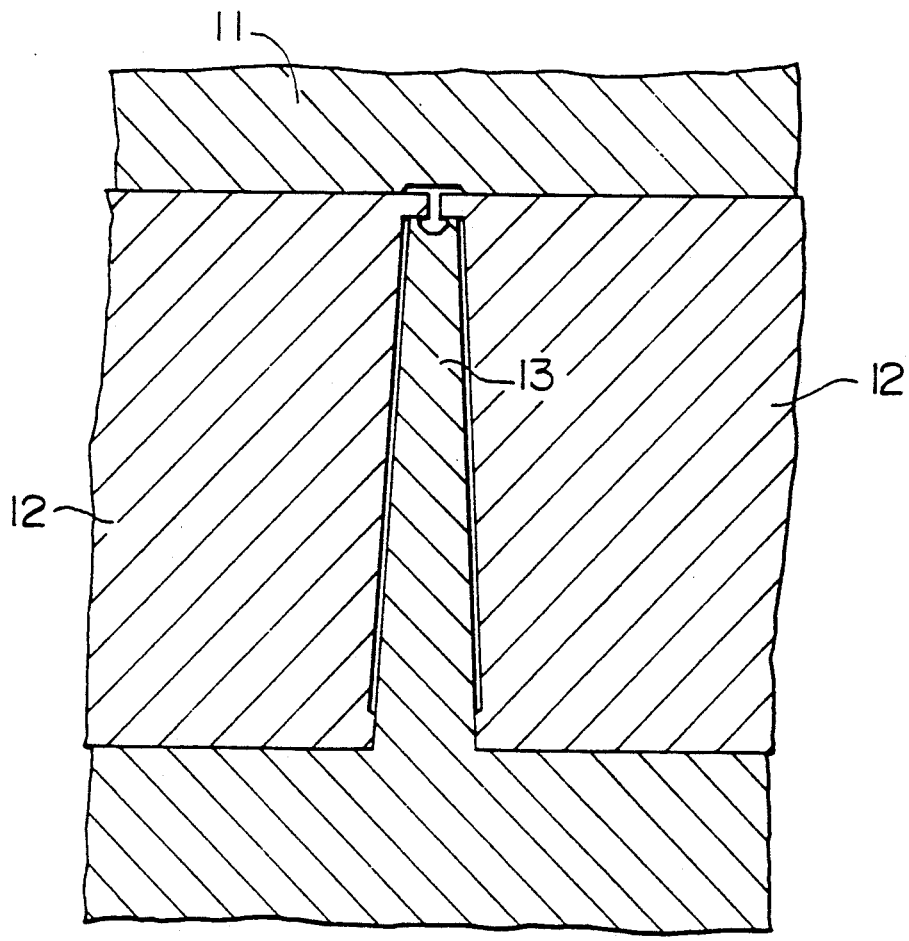
FIG. 27 is a fragmentary sectional view showing a conventional shutter moulding apparatus.

Further, referring to FIG. 21, in the shutter according to other embodiment, the side plate is divided into two parts 60 and 61 by a bisector (broken line). The relationships, for example, between the thicknesses t1 and t2, are substantially identical as in the embodiment shown in FIGS. 15 to 20, and the explanation therefor is omitted.

According to the present invention, an ejection mark is provided on a part of the outer surface of either side plate of the shutter including a part corresponding to the connecting portion of the connecting plate. Accordingly, since the moulded shutter is pushed up at a relatively thick portion so as to be ejected, the shutter is hardly deformed on the ejection, thereby conducting ejection work effectively.

Further, since no ejection means is provided within the slide core and the ejection means is separated from the slide core, the slide core becomes simple and readily manufactured. Furthermore, it is possible to shorten a cooling time period and to improve an efficiency of moulding of the shutter with a decrease of the defective one.

According to the present invention, since the mould clamping force is directly applied to the slide core to support it, the deflection of the slide core on the moulding is prevented, thereby eliminating the thickness deviation in the side plates of the shutter and the moulding flash. The shutter moulded with a high accuracy in the dimension thereof can be obtained.

The gate mark is provided only on a edge of the shutter opposite to an edge thereof to which a shutter opening member is adapted to abut. Therefore, it is eliminated that the gate mark prevents the opening member from engaging with side end of the shutter and then prevents the driving of the shutter. Improved is a reliability on the driving of the shutter to open the head access window of the cartridge casing.

To provide a plurality of gates in the mould shortens the injection time, thereby improving the efficiency of moulding of the shutter. Further, since the gate mark formed on the edge of the moulded shutter, to which the shutter opening member abuts is smaller than that on the opposite edge, the possibility of misengagement between the opening member and the shutter is reduced as compared with the conventional one. Therefore, improved is a reliability on the driving of the shutter to open the head access window of the cartridge casing.

the invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A shutter, molded of synthetic resin, for a disk cartridge for closing and opening a head access hole formed in a cartridge casing accommodating therein a rotatable disk, said shutter comprising:
    a pair of side plates facing each other;
    a connection plate for connecting corresponding ends of said side plates to provide said shutter with a substantially U-shaped cross-section, said connection plate extending from an outer surface of one of said side plates to an outer surface of the other of said side plates; and
    an ejection mark made by an ejection pin during moulding which at least partially extends an end surface of said connection plate into said outer surface of said respective side plate, said ejection mark being elongated, having a width substantially identical to a thickness of said connection plate, juxtapositioned to where said side plates join with said connection plate, referred to as a connection portion.

2. A shutter according to claim 1,
    wherein said connection plate has opposite edges, one on which a shutter opening member of a recording-/reproducing apparatus is adapted to abut; and
    the other on which a gate mark is provided.

3. A shutter, made of synthetic resin, for a disk cartridge for closing and opening a head access hole formed in a cartridge casing accommodating therein a rotatable disk, said shutter comprising:
    a pair of side plates facing to each other;
    a connection plate for connecting corresponding ends of said side plates to provide said shutter with a substantially U-shaped cross-section;
    a first edge on which a shutter opening member of a recording/reproducing apparatus is adapted to abut, said first edge being provided with a first gate mark; and
    a second edge opposite to said first edge, said second edge being provided with a second gate mark larger than said first gate mark.

4. A shutter according to claim 3, further including a guide claw for guiding the movement of said shutter, said guide claw being projected from an inner surface of at least one of said side plates, juxtapositioned to said connection plate.

5. A shutter according to claim 3, further including a guide claw for guiding the movement of said shutter, projected from an inner surface of said connection plate.

6. A disk cartridge on which a shutter according to any of claims 3 to 5 is mounted.

7. A shutter, moulded of synthetic resin, for a disk cartridge for closing and opening a head access hole formed in a cartridge casing accommodating therein a rotatable disk, said shutter comprising: p1 a pair of side plates facing each other;
    a connection plate for connecting corresponding ends of said side plates to provide said shutter with a substantially U-shaped cross-section, said connection plate extending from an outer surface of one of said side plates to an outer surface of the other of said side plates; and
    an ejection mark made by an ejection pin during moulding which at least partially extends an end surface of said connection plate into said outer surface of said respective side plate said ejection mark being elongated, having a width substantially identical to a thickness of said connection plate, juxtapositioned to where said side plates join with said connection plate, referred to as a connection portion.

* * * * *